United States Patent
Angwin et al.

(12) 
(10) Patent No.: US 6,477,576 B2
(45) Date of Patent: Nov. 5, 2002

(54) METHODS, SYSTEMS AND COMPUTER PROGRAM PRODUCTS FOR THE AUTOMATED DISCOVERY OF A SERVICES MENU

(75) Inventors: Alastair J. Angwin, Eastleigh (GB); David George Bevis, Eastleigh (GB); Stefan Georg Hild, Zurich (CH); Sandeep Kishan Singhal, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,375

(22) Filed: Jun. 17, 1999

(65) Prior Publication Data
US 2002/0059405 A1 May 16, 2002

(51) Int. Cl.[7] .............................................. G06F 15/173
(52) U.S. Cl. ..................... 709/226; 709/217; 709/219; 709/225; 709/227; 709/228; 709/246
(58) Field of Search ................. 709/217, 219, 709/225, 226, 227, 228, 246

(56) References Cited

U.S. PATENT DOCUMENTS

| | | | | |
|---|---|---|---|---|
| 5,548,726 A | | 8/1996 | Pettus | 395/200.09 |
| 5,564,071 A | | 10/1996 | Liou et al. | 45/56.1 |
| 5,689,700 A | | 11/1997 | Miller et al. | 395/610 |
| 5,757,925 A | * | 5/1998 | Faybishenko | 380/49 |
| 5,761,499 A | | 6/1998 | Sonderegger | 395/610 |
| 5,761,500 A | | 6/1998 | Gallant et al. | 395/610 |
| 5,774,671 A | * | 6/1998 | Satoh | 709/231 |
| 5,778,367 A | | 7/1998 | Wesinger, Jr. et al. | 707/10 |
| 5,784,563 A | * | 7/1998 | Marshall et al. | 709/221 |
| 5,819,284 A | * | 10/1998 | Farber et al. | 707/104 |
| 5,857,201 A | | 1/1999 | Wright, Jr. et al. | 707/104 |
| 5,949,977 A | * | 9/1999 | Hernandez | 709/229 |
| 5,983,227 A | * | 11/1999 | Nazem et al. | 707/10 |
| 5,991,735 A | * | 11/1999 | Gerace | 705/10 |
| 6,049,831 A | * | 4/2000 | Gardell et al. | 709/236 |
| 6,105,060 A | * | 8/2000 | Rothblatt | 709/219 |
| 6,131,116 A | * | 10/2000 | Riggins et al. | 709/219 |
| 6,167,441 A | * | 12/2000 | Himmel | 709/217 |
| 6,226,030 B1 | * | 5/2001 | Harvey et al. | 348/7 |
| 6,272,129 B1 | * | 8/2001 | Dynarski et al. | 370/356 |
| 6,272,545 B1 | * | 8/2001 | Flanagin et al. | 709/228 |
| 6,279,030 B1 | * | 8/2001 | Britton et al. | 709/203 |
| 6,285,362 B1 | * | 9/2001 | Kikuchi et al. | 345/329 |
| 6,317,718 B1 | * | 11/2001 | Fano | 705/1 |
| 6,332,131 B1 | * | 12/2001 | Grandcolas et al. | 705/35 |

* cited by examiner

*Primary Examiner*—Saleh Najjar
(74) *Attorney, Agent, or Firm*—Myers Bigel Sibley & Sajovec; A. Bruce Clay (57) ABSTRACT

Methods, systems and computer program products are provided for the automated discovery of a services menu of a processing system such as a pervasive computing device by broadcasting to a plurality of devices connected to a network, a Request Services Menu message. The Request Services Menu message provides information about the pervasive computing device broadcasting the message. In response to the broadcast message, a services menu associated with the pervasive computing device is received and provided to a user of the pervasive computing device. The services menu may also be updated by sending a Services Menu Update to the device.

51 Claims, 5 Drawing Sheets

METHODS, SYSTEMS AND COMPUTER PROGRAM PRODUCTS FOR THE AUTOMATED DISCOVERY OF A SERVICES MENU

FIELD OF THE INVENTION

The present invention relates to network management in general and in particular to networks employing pervasive computing devices with limited storage capabilities.

BACKGROUND OF THE INVENTION

With the increasing mobility of today's society, the demand for mobile computing capabilities has also increased. Many workers and professionals are downsizing their laptop computers to smaller palm-top or hand-held devices, such as personal digital assistants (PDAs). In addition, many people now utilize cellular telephones to access the Internet and to perform various other computing functions. Computing devices including, but not limited to, PDAs, cellular telephones, and computing devices utilized within appliances and automobiles are often collectively referred to as "pervasive" computing devices. Many handheld computing devices utilize the Microsoft® Windows CE, 3Com Palm Computing®, and Symbion Epoc platforms as well as web browsers such as HandWeb from SmartCode, Inc. and the Pocket Internet Explorer from Microsoft, Inc. As used herein, the term "pervasive computing device" refers to a data processing system which may connect to different networks and is intended to include PDAs, laptop and portable computers, penbased portable computers, wireless telephones, smart phones, screenphones, copies and other office equipment, appliances, factory controllers, etc.

Unfortunately, as the size of pervasive computing devices has decreased, typically, the capabilities of the devices for stand alone operation have also decreased. Such devices generally have reduced amounts of memory, little or no permanent storage capabilities and no display or reduced size displays having reduced color capabilities and resolution. For example, many of the emerging pervasive computing devices do not execute applications locally on the device but, instead, obtain a menu of available services from a network server and then act as a portable network terminal for execution of the available applications. Such devices typically are highly portable and may connect to many different networks as the user moves throughout an operating environment.

It is well known in the art for a network terminal or networked computer to learn its Internet Protocol (IP) address upon booting. For example, using the Address Resolution Protocol (ARP) a machine publishes its Ethernet Media Access Control (MAC) address and an ARP server returns the IP address that should be used for subsequent IP transmissions. Such an address resolution model has further been used in newer protocols such as Dynamic Host Configuration Protocol (DHCP).

As described above, pervasive computing devices, however, may be less capable than even networked terminals. Certain pervasive computing devices typically require a description of the set of available services that the user may access from within the network environment in which the device currently resides (i.e., a services menu). Such a list of services may be provided, for example, as a Hyper-Text Markup Language (HTML) home page for networked computers, a Wireless Markup Language (WML) deck for smart phones and PDAs or a Speech Markup Language (SpeechML) or Voice Markup Language (VOXML) menu for voice-based devices. Thus, the services and mechanism for delivery may change from environment to environment and may further be limited depending on the type of pervasive computing device connecting to the network. Furthermore, unlike address resolution, the pervasive computing device is typically under the physical control of the end-user rather than an issuing authority and, therefore, the parameters of the device may be substantially more diverse than, for example, merely providing an IP address to an Ethernet adapter.

Currently, in order for a pervasive computing device to obtain a list of services, the device typically must have a priori knowledge of the environment in which it is operating to obtain the list from a predefined server. For example, a pervasive device would access a predefined Universal Resource Locator (URL) for the network to which it is connected to obtain the list of services. Alternatively, the networks to which the device may attach typically must be specifically configured to route special URLs to predefined servers. However, such systems may require knowledge at the device of the different URLs to access and knowledge of the network to which the device is connected or cooperation among service providers to agree on common treatment of these special URLs. Such restrictions may limit the usability of pervasive computing devices.

In light of the above discussion, a need exists for a user friendly mechanism by which pervasive computing devices may obtain a list of available services available to the devices which does not require a priori knowledge of the network environment by the pervasive computing device or extensive cooperation among service providers.

SUMMARY OF THE INVENTION

Accordingly, it is an object of the present invention to provide methods, systems and computer program products which can obtain a services menu without requiring prior knowledge of the location of the services menu.

It is a further object of the present invention to provide such methods, systems and computer program products that can automatically accommodate various types of hardware operating under different operating systems.

A still further object of the present invention is to provide methods, systems and computer program products which enhance the mobility of pervasive computing devices.

Another object of the present invention is to provide methods, systems and computer program products which are user friendly and require no user setup.

These and other objects can be provided, according to the present invention, by methods, systems and computer program products which automatically obtain a service menu for a data processing system, such as a pervasive computing device, connected to a network by broadcasting to a plurality of devices connected to the network, a Request Services Menu message. The Request Services Menu message provides information about the pervasive computing device broadcasting the message. In response to the broadcast Request Services Menu message, a services menu associated with the pervasive computing device is received and provided to a user of the pervasive computing device.

By broadcasting a request for a services menu to the network, the pervasive computing device does not have to know in advance the location of the server which provides the services menu to the device. Furthermore, because the services menu is provided in response to a specific request, rather than a general HTTP request for a URL, the request may be broadcast onto the network. Devices which cannot or need not respond to the request may ignore the request. Thus, the present invention provides for obtaining a services menu for a pervasive computing device without requiring the device to know in advance the location from which the services menu is to be obtained. Accordingly, a user of the device may simply connect to the network and the services menu may be automatically obtained without requiring the user to know the specifics of the network configuration to which the device is attached.

In a further embodiment of the present invention, the services menu received in response to the broadcast Request Services Menu message is a pointer to a services menu file. In such a case, the device may request the services menu file utilizing the pointer received in response to the broadcast Request Services Menu message.

In another embodiment of the present invention, the Request Services Menu message includes at least one of information regarding a user of the pervasive computing device, the type of pervasive computing device and/or the connection between the pervasive computing device and the network. In such a case, a pointer to a services menu file or a services menu file may be selected based on one or more of the information regarding a user of the pervasive computing device, the information regarding the type of pervasive computing device and/or the information regarding the connection between the pervasive computing device and the network included in the Request Services Menu message. In response to the broadcast Request Services Menu message, the selected pointer to a services menu is transmitted to the pervasive computing device.

In a particular embodiment of the present invention, the pointer is a Universal Resource Locator (URL).

In a further aspect of the present invention, a services menu or pointer to a services menu is generated for transmission to the pervasive computing device in response to receiving a broadcast Request Services Menu message from the pervasive computing device. The generated services menu or pointer is then transmitted to the pervasive computing device. In particular, the services menu or pointer may be generated by accessing a services menu database. Where the Request Services Menu message includes at least one of, information regarding a user of the pervasive computing device, the type of pervasive computing device and/or the connection between the pervasive computing device and the network, the services menu database may be accessed based on the provided information regarding a user of the pervasive computing device, the type of pervasive computing device and/or the connection between the pervasive computing device and the network included in the Request Services Menu message.

In still another embodiment of the present invention, the services menu received by the pervasive computing device may include pointers to additional services menus accessible to the pervasive computing device. Furthermore, at least one of the services associated with the services menu received by the pervasive computing device may be a telephony service. Also, the services menu received by the pervasive computing device may include credentials for presentation by the pervasive computing device to access services identified in the services menu. In addition, the received services menu may be encrypted. In such a case, the pervasive computing device may decrypt the received services menu.

In another embodiment of the present invention an update of the services menu is provided by receiving a Services Menu Update message containing information associated with a modification to the services menu of the pervasive computing device. The services menu displayed to the user is then updated to incorporate the modifications to the services menu contained in the Services Menu Update message. Preferably, the Services Menu Update message contains at least one of information regarding a delete operation, information regarding an add operation and/or information regarding a replace operation. In a particular embodiment it is determined if a change to the services menu of the pervasive computing device has occurred and a Services Menu Update message is transmitted to the pervasive computing device if a change to the services menu of the pervasive computing device has occurred.

By providing an update procedure to the services menu of the pervasive computing device, the present invention may assure that the user is displayed a current services menu. Furthermore, such an ability allows for the control of the services menu presented to a user, for example, to add and remove services which are only temporarily accessible to the user or to present different services menus for different user environments.

While the invention has been described above primarily with respect to the method aspects of the invention, both systems and/or computer program products are also provided.

DERAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention is preferably written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

As is described in more detail below, the present invention allows for a first processor such as a pervasive computing device to obtain a list or identification of services available to the first processor for a network session of the first processor. The present invention utilizes broadcast requests for a services menu from remote processors such as pervasive computing devices to a network having access to a menu server which either provides the menu of services or provides a pointer to the location of the menu of services (e.g. a URL). Thus, for differing sessions of the pervasive computing device the menus provided may differ or come from different servers, however, the pervasive computing device need only know to broadcast onto the network to which it is connected the request for a services menu.

The types of information typically utilized to control the services available for a session may include the type of network connection (e.g. ethernet, modem, modem speed, duration of connection, connection cost, etc), the type of device connected (e.g. laptop computer, PDA, pen based system, cellular telephone, voiced based system, etc), characteristics of the device connected (e.g. display type, operating system, processing power, memory, etc) and the user identification of the user. Collectively, this information makes up the operating environment of a user session. Based on all or part of the information about a user's operating environment, the services available to the pervasive computing device may be identified so as to take advantage of the particular operating environment of a session.

Figure 1:
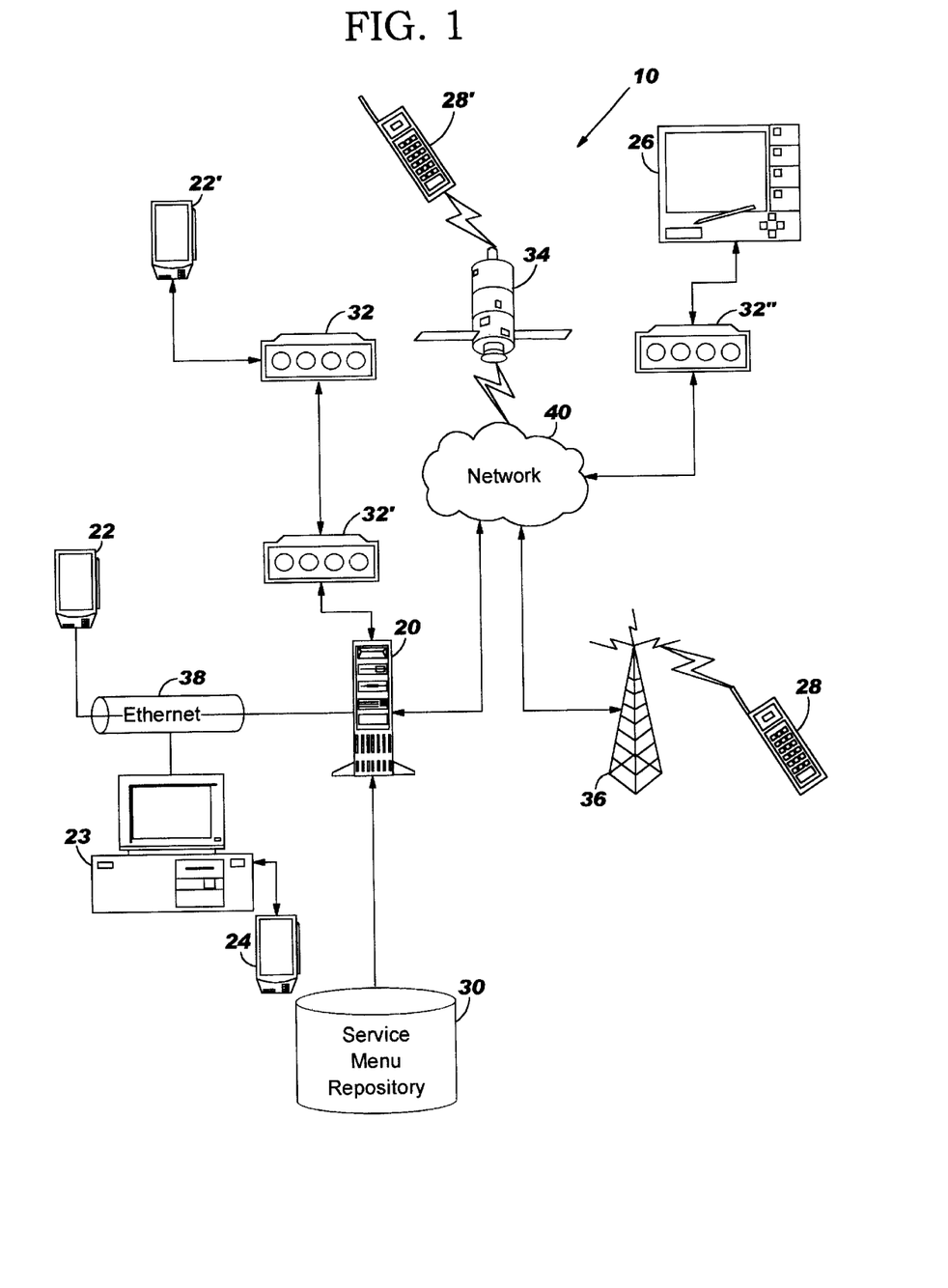
FIG. 1 is a schematic diagram of a computer network suitable for use with the present invention.

FIG. 1 illustrates a system 10 in which the present invention may be beneficially utilized. As seen in FIG. 1, a server 20 may be accessed from a number of differing data processing systems (i.e., computers) such as PDAs 22 and 22', desktop computer 23, PDA 24, pen based computer 26, cellular telephone 28, which may be a smartphone, screenphone or voice only telephone and satellite telephone 28' which may be a smartphone, screenphone or voice-only telephone. These differing data processing systems 22, 22', 23, 24, 26, 28 and 28' may each have differing processing capabilities, data presentation capabilities, operating systems and/or applications which request information from server 20. Furthermore, each of these differing data processing systems 22, 22', 23, 24, 26, 28 and 28' may be utilized by different users with different services associated with the users. As will be appreciated by those of skill in the art, other types of processing systems may also benefit from utilization of the present invention.

The differing data processing systems 22, 22', 23, 24, 26, 28 and 28' may also utilize different communication techniques for communicating with server 20. For example, PDA 22 and desktop computer 23 may utilize a network interface card to communicate with server 20 over a direct network connection such as the Ethernet 38 illustrated in FIG. 1. PDA 22' may communicate directly with server 20 through modem 32 and modem 32'. PDA 24 is illustrated as communicating with server 20 through desktop computer 23. Similarly, pen based computer 26 may communicate through a modem 32" connection to the network 40 which may be the Internet or an intranet. Cellular telephone 28 may communicate with server 20 through a cellular connection 36 and the network 40. Finally, satellite telephone 28' may communicate with server 20 through a satellite connection 34 and the network 40.

Furthermore, as will be appreciated by those of skill in the art, the type of connection may change from session to session. Thus, for example, while PDA 22' is illustrated as using a modem to modem direct connection to communicate with server 20, in a subsequent session, PDA 22' could communicate with server 20 through a network connection, by for example, connection to Ethernet 38. As is seen from the examples in FIG. 1, data processing systems may communicate with a server using a wide variety of connection types with differing connection characteristics. Some connection types may be high speed, low cost, connections, such as the Ethernet connection 38, while others may be lower speed, higher cost, connections, such as the cellular connection 36 or lower speed, lower cost, connections such as through a modem 32.

As is further illustrated in FIG. 1, server 20 has access to a services menu repository 30. The services menu repository 30 may be incorporated in server 20 or may be accessible through a network or other communication connection. The services menu repository 30 may also be periodically downloaded or otherwise provided to server 20 and a copy of the services menu repository 30 maintained by server 20. The services menu repository 30 preferably includes an identification of the services available to users of processing systems such as the data processing systems 22, 22', 23, 24, 26, and 28 illustrated in FIG. 1. The services menu repository 30 may include the services menus to be provided to data processing systems or, as described above, may include links to other locations where the menus may be obtained. While the services menu repository 30 is illustrated and described in the present application as a single database, as will be appreciated by those of skill in the art, multiple databases may be utilized.

In general, in a system according to the present invention, when one of data processing systems 22, 22', 23, 24, 26 and 28, initially establishes a connection to a network, the data processing system broadcasts a Request Services Menu message on the network. The Request Services Menu message preferably includes the requesting data processing system's physical address (which may be an Ethernet address, a telephone number, a serial number, etc) and may include information on the data processing system itself, user of the data processing system and/or network to which the data processing system is connected. The broadcast Request Services Menu message is received by server 20. Server 20 accesses the services menu repository 30 and, based on the information in the Request Services Menu message determines which menu of services to provide to the requesting device. The server 20 then provides the services menu to the requesting data processing system.

The services menu provided to the requesting data processing system may be tailored to the characteristics of a session with the requesting data processing system. For example, content provided to a smartphone with a limited viewing area and display resolution may be tailored to provide only a limited menu of services or may be tailored to a format such as WML allowing for effective display on a small screen. Alternatively, if the requesting device has voice-only capabilities, then the services menu may be provided as SpeechML or VOXML. As a further example, the services identified in the services menu may be tailored based on the speed or cost of the communication connection such that communication intensive applications are limited. Furthermore, the services provided may be tailored based on other factors, such as billing information, for example, if the use of services is to be prepaid or if different levels of services are provided to different customers. Furthermore, because the connection type may change from session to session, the menu of services may change from session to session. Thus, for example, when PDA 24 is connected through a cellular connection 36 the menu of services may differ from that obtained when PDA 24 is connected through Ethernet 38. Similarly, if a user utilizes both a smartphone, such as cellular telephone 28, and a PDA 24, then the services menu provided may differ when the user uses cellular telephone 28 or PDA 24.

Figure 2:
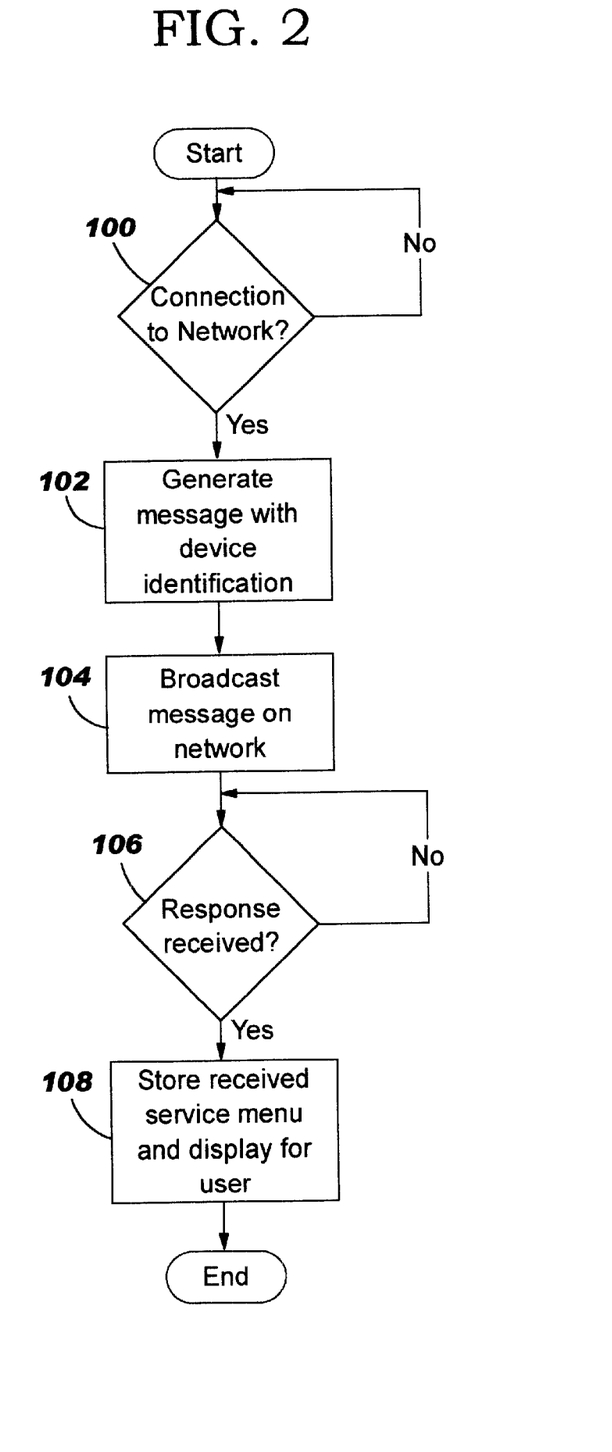
FIG. 2 is a flowchart illustrating operations of a pervasive computing device according to one embodiment of the present invention.

FIG. 2 illustrates operations according to one embodiment of the present invention. As is seen in FIG. 2, a pervasive computing device, such as the data processing systems 22, 22', 23, 24, 26, and 28 illustrated in FIG. 1, waits for connection to a network, such as network 40 or Ethernet 38 (block 100). The present invention may also be utilized with a direct connection to a server which may act as a gateway to a network, such as illustrated by modem 32 and 32'.

After connecting to the network, the pervasive computing device generates a Request Services Menu message which preferably includes at least an address identifying the pervasive computing device (block 102). The type of message generated may depend on the protocols utilized, however, it is preferred that the message be an IP datagram. As will be appreciated by those of skill in the art, the particular address included in the Request Services Menu message may depend on the type of connection and/or the type of device utilized. Thus, the address may be an IP address, an Ethernet address, a telephone number, a subscriber identification or other such address which allows for communication with the pervasive computing device. Preferably, the Request Services Menu message also includes further information about the session of the pervasive computing device. For example, the message may include information such as the type of device, a user identification such as user logon, user account information, user preferences, user passwords, connection information such as the connection speed or device characteristics such as the type of display or other information which may be useful in determining the services to be included in the services menu or the format for providing such menu to the pervasive computing device. Furthermore, device information may be included in the Request Services Menu message utilizing the CC/PP grammar.

After generating the Request Services Menu message the pervasive computing device broadcasts the message onto the network to which the device is connected (block 104). As used herein, the term broadcast is used to describe the transmission of the same message to a plurality of devices connected to a network. Such a message may be broadcast to every device connected to the network or to devices connected to the network which have network addresses within a predefined range of addresses. Thus, the term broadcast is intended to refer to both broadcast and multicast messages. The message is broadcast because the pervasive computing device may not know in advance the address or location of the server on the network which provides the services menu. If a networked device receives the message and cannot respond to the message, then the message is ignored by that device. However, when the message is received by the server which is capable of providing the services menu to the pervasive computing device, then the operations of FIG. 3 may be performed to respond to the message. Such a server may be referred to as a "Service Boot Host" and is illustrated in FIG. 1 by server 20.

After broadcasting the Request Services Menu message, the pervasive computing device waits for a response (block 106). When the response is received by the pervasive computing device, the response may be stored locally at the device and displayed to the user (block 108). The display of the response to the user may be carried out as a visual display, an audio display and/or a tactile display. Thus, the display of a menu need not be limited to visual display.

As briefly described above, the response from the server 20 may be a complete menu of services or may be a pointer, such as a URL, to a services menu. In the latter case, the pervasive computing device may request the services menu from the location specified by the pointer to obtain the services menu (e.g. request the specified URL by issuing a Hyper-Text Transfer Protocol (HTTP), Gopher, File Transfer Protocol (FTP) or other protocol request) prior to displaying the services menu to the user. Furthermore, the services menu may contain pointers to further services. For example, an initial services menu may provided pointers to a communications services menu, a data services menu, a management services menu or a software inventory services menu. The response may also include credentials, such as a password, which should be presented to access services provided in the services menu. Furthermore, the response received from server 20 may be encrypted to increase security. In such a case the pervasive computing device may decrypt the received-response before displaying the response to the user.

Figure 3:
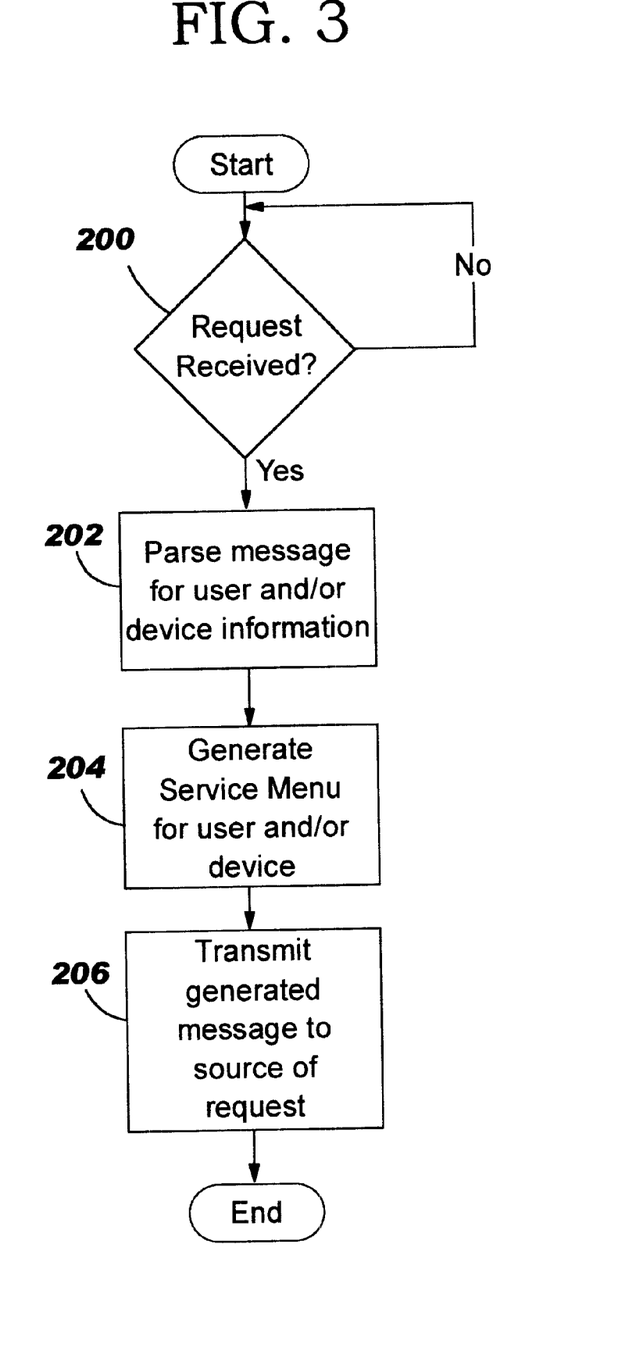
FIG. 3 is a flowchart illustrating operations of a network server according to one embodiment of the present invention.

FIG. 3 illustrates the operations of a Service Boot Host, such as server 20, according to one embodiment of the present invention. As seen in FIG. 3, the Service Boot Host waits for receipt of a Request Services Menu message from a pervasive computing device or other remote processing system (block 200). After receiving the Request Services Menu message the Service Boot Host parses the message to obtain the information contained in the message such as a source address, the user identification, device information or the like (block 202). This information is then used to generate the services menu information to be provided to the device specified by the source address of the Request Services Menu message (block 204).

As described above, the message may be a URL or other pointer to the location of the services menu for the requesting device. However, preferably, the server 20 accesses a database such as the services menu repository 30 illustrated in FIG. 1. The server 20 may use information about the user of the pervasive computing device, the type of device, the connection to the device, billing information or the like to select a services menu from the services menu repository 30 to provide to the source of the request message. For example, user information received in the Request Services Menu message may be utilized to look up in the service menu repository database 30 the services for which a user is authorized. The type of device specified by the Request Services Menu message could then be utilized to filter the services for the particular device to eliminate those which are incompatible and then a services menu is generated in HTML, WML, SpeechML or other appropriate language based on the device type. Once the services menu is generated by the Service Boot Host, the services menu is transmitted to the source device specified by the Request Services Menu message (block 206). As described above, the services menu may be transmitted by transmitting the generated menu or a pointer to the generated menu.

As is seen from the above discussion, the benefits of the present invention are achieved through the utilization of a specific message, such as the Request Services Menu message, which is only acted upon by a specific server and which may be broadcast to devices on a network without knowing a specific destination for the message. Thus, a pervasive computing device need not know the address or location of a Service Boot Host in order to obtain a services menu because the pervasive computing device can broadcast the specific message and know that, if a Service Boot Host is accessible to the network to which the device is attached, then it will receive a services menu in response to the request. Thus, pervasive computing devices may connect to different networks in different manners without knowing in advance the configuration of the network or the location of a host which will provide the device a services menu. Furthermore, such devices may be assured of having the latest available services menu as the menu is provided each time the device establishes a session to the network.

In a further aspect of the present invention, changes to a services menu are provided to a device connected to the network by utilizing a Services Menu Update message which is transmitted from the Service Boot Host to the pervasive computing device. Operations for performing such an update are illustrated in FIGS. 4 and 5.

Figure 4:
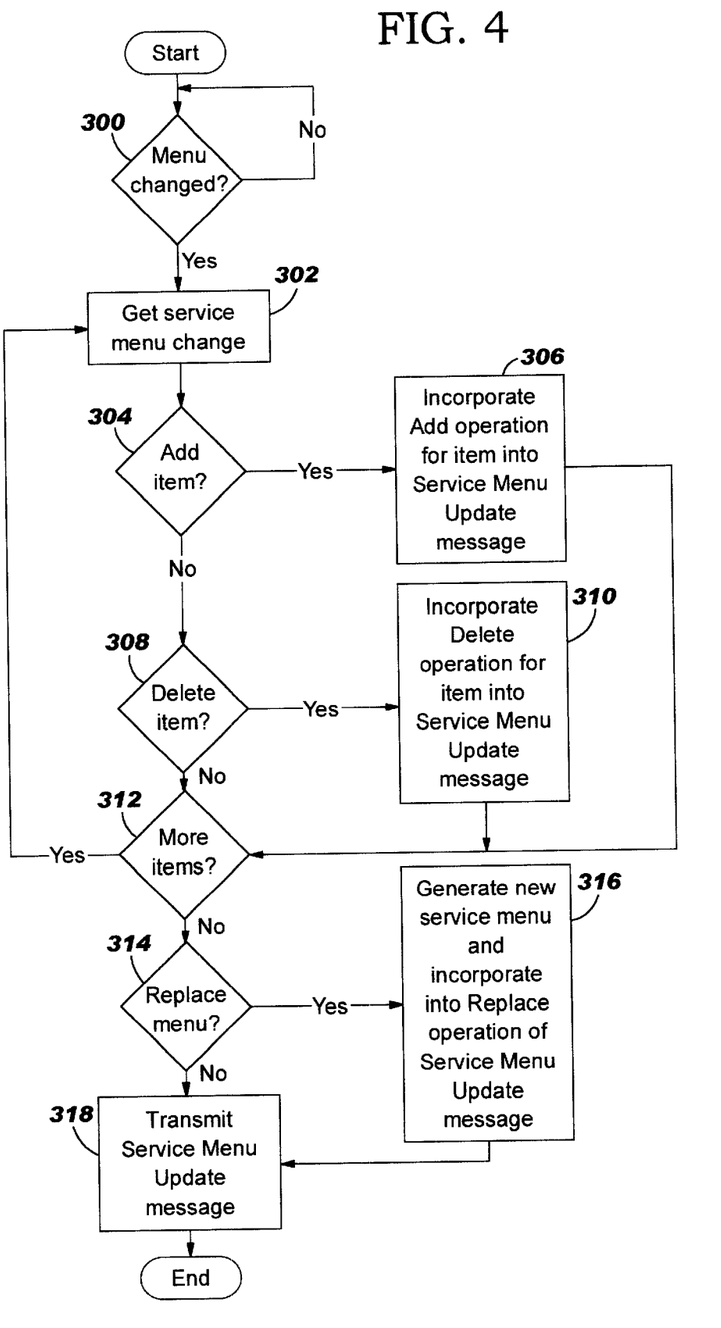
FIG. 4 is a flowchart illustrating operations of a network server according to the present invention to update a services menu provided to a pervasive computing device.
Figure 5:
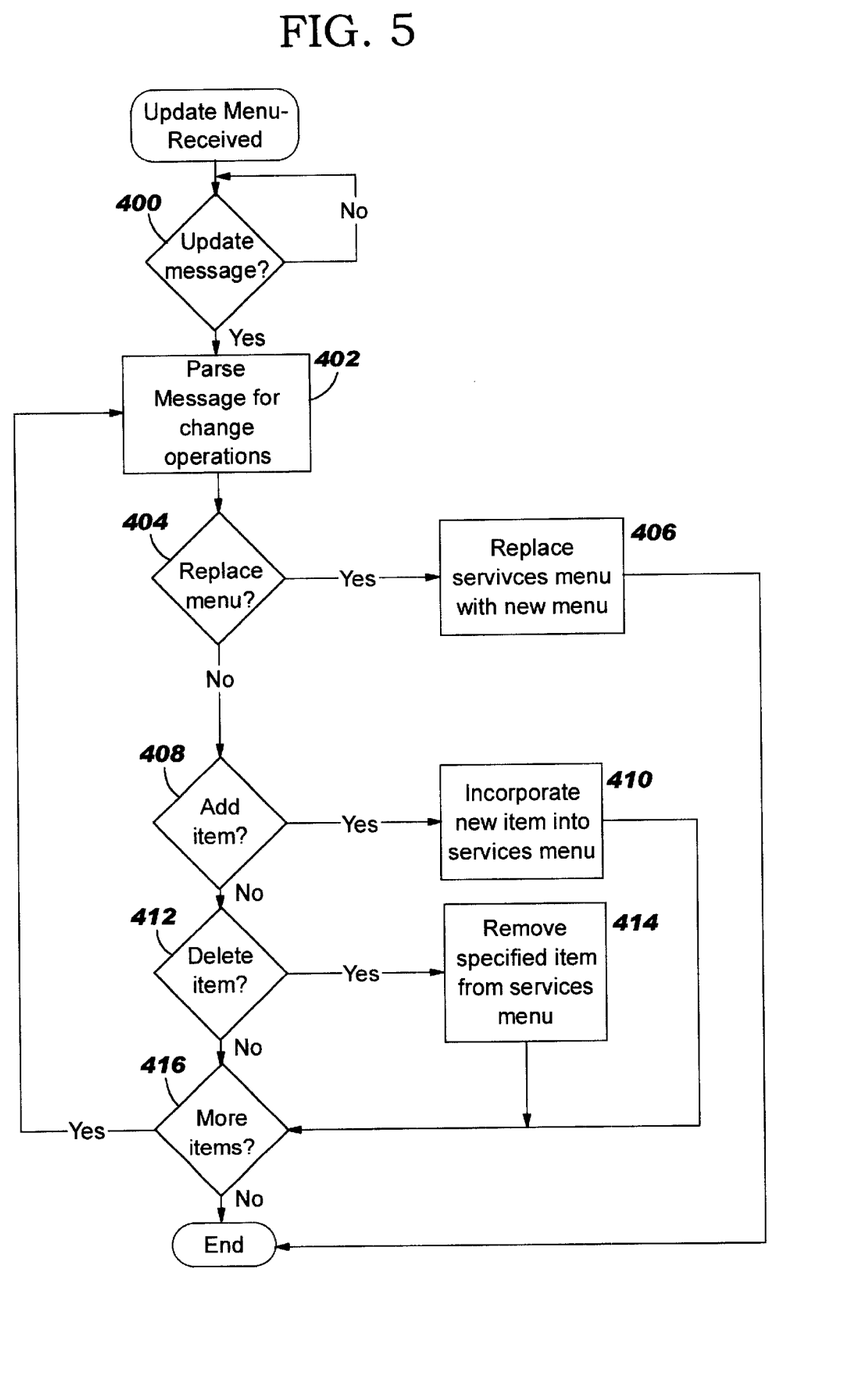
FIG. 5 is a flowchart illustrating operations of a pervasive computing device to update a services menu provided to the pervasive computing device.

As seen in FIG. 4, the Service Boot Host detects that a menu has changed for a connected device which had previously received a services menu from the Service Boot Host (block 300). When the menu has changed, each change to the menu may be obtained for processing (block 302). When a menu change is processed it is determined if the menu change adds a new item to the menu (block 304). If the change requires a new menu item, then an add operation reflecting the new menu item is incorporated into a Services Menu Update message, which may be an IP datagram, to be transmitted to the connected pervasive computing device (block 306). If there are more changes to the menu (block 312), then the next change is obtained (block 302).

If the change is not an add, then it is determined if the change deletes an item from the menu (block 308). If the change is a delete then a delete operation to remove the item from the services menu of the device is incorporated into the Services Menu Update message (block 310). These operations continue until all changes have been processed. As will be appreciated by those of skill in the art, a replace operation which replaces a single menu item may be carried out by a series of delete and add operations or an explicit replace command may be used.

When all of the changes have been processed, it is determined if there are sufficient changes to justify replacing the entire menu (block 314). If such is the case, then the new services menu is generated and included as part of a replace menu operation in the Services Menu Update message (block 316). Alternatively, a single replace menu instruction could be obtained as the menu change, in which case, the "no" paths from blocks 304, 308 and 312 would be taken and the "yes" path from block 314 would be taken to generate the Services Menu Update message. the Services Menu Update message may include an instruction to the device to issue a new Request Services Menu request to refresh its menu. In any event, when the entire Services Menu Update message has been generated, it is transmitted to the device (block 318).

FIG. 5 illustrates the operations of the pervasive computing device when it receives the Services Menu Update message. Block 400 illustrates the device waiting for the message. When the message is received, the device parses the message for a change operation in the message (block 402). If the change operation is a replace menu operation (block 404), then the device replaces the existing services menu with the new menu received in the message (block 406). Such a replacement operation may be carried out by purging the existing services menu from storage and storing and, if appropriate, displaying a new menu included with the update message. Alternatively, rather than replacing the services menu utilizing data in the Services Menu Update message, the Service Boot Host could instruct the pervasive computing device to send an new Request Services Menu message. Re-sending such a message would cause the services menu of the pervasive computing device to be re-transmitted to the device, thereby, updating the services menu of the device. In any event, after replacing the services menu the update operations are concluded.

If the change operation is not a replace menu operation, then it is determined if the change operation is an add item operation (block 408). If the change operation is an add operation, then the new item is added to the services menu and the new menu is displayed, if appropriate (block 410). The next change operation is then obtained if additional change operations are present in the update message (blocks 416 and 402). If no more changes are present in the update message, then the update operations conclude. As will be appreciated by those of skill in the art, while the present invention is described with respect to displaying change operations as they are processed, alternatively, multiple operations may be processed before the changes displayed. Thus, the present invention should not be construed as limited to any particular sequence of display and processing change operations.

If the change operation is not an add operation, then it is determined if the change operation is a delete operation (block 412). If the change operation is a delete operation, then the existing item is deleted from the services menu and the new menu is displayed, if appropriate (block 414). The next change operation is then obtained if additional change operations are present in the update message (blocks 416 and 402). If no more changes are present in the update message, then the update operations conclude.

Thus, by allowing for update of services menus for devices connected to the network, the present invention allows a user to have the latest services menu available. Furthermore, such an update process allows for changing a menu of available services based, for example, on time of day or billing status of a user. For example, a user may have prepaid for 1 hour of use of a particular service. After that hour has expired the user's services menu could be updated to remove the particular service from the services menu. These examples are provided to illustrate the usefulness of the update aspects of the present invention. As will be appreciated by those of skill in the art, any number of circumstance may arise where changes in a menu are desired. Accordingly, the present invention should not be construed as limited to a particular reason or basis for causing an update of a services menu of a pervasive computing device.

in the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for discovering the service directory of a data processing system connected to a network, the method comprising the steps of:
   broadcasting to a plurality of devices connected to the network, a Request Services Menu message;
   receiving, in response to the broadcast Request Services Menu message, a services menu associated with the data processing system; and
   providing the received services menu to a user of the data processing system.

2. A method according to claim 1, wherein the data processing system is a pervasive computing device.

3. A method according to claim 1, wherein the Request Services Menu message provides information about the data processing system broadcasting the message.

4. A method according to claim 2, wherein the services menu received in response to the broadcast Request Services Menu message is a pointer to a services menu file, the method further comprising the step of requesting the services menu file utilizing the pointer received in response to the broadcast Request Services Menu message.

5. A method according to claim 4, wherein the Request Services Menu message includes at least one of, information regarding a user of the pervasive computing device, information regarding the type of pervasive computing device and information regarding the connection between the pervasive computing device and the network, the method further comprising the steps of:
   selecting a pointer to a services menu file based on the at least one of information regarding a user of the pervasive computing device, information regarding the type of pervasive computing device and information regarding the connection between the pervasive computing device and the network included in the Request Services Menu message; and
   transmitting, in response to the broadcast Request Services Menu message, the selected pointer to a services menu to the pervasive computing device.

6. A method according to claim 4, wherein the pointer is a universal resource locator (URL).

7. A method according to claim 2, further comprising the steps of:
   generating a services menu for transmission to the pervasive computing device in response to receiving a broadcast Request Services Menu message from the pervasive computing device; and
   transmitting the services menu to the pervasive computing device.

8. A method according to claim 7, wherein the step of generating a services menu comprises the step of accessing a services menu database.

9. A method according to claim 8, wherein the Request Services Menu message includes at least one of, information regarding a user of the pervasive computing device, information regarding the type of pervasive computing device and information regarding the connection between the pervasive computing device and the network, and
   wherein the services menu database is accessed based on the at least one of information regarding a user of the pervasive computing device, information regarding the type of pervasive computing device and information regarding the connection between the pervasive computing device and the network included in the Request Services Menu message.

10. A method according to claim 2, wherein the services menu received by the pervasive computing device comprises pointers to additional services menus accessible to the pervasive computing device.

11. A method according to claim 2, wherein at least one of the services associated with the services menu received by the pervasive computing device is a telephony service.

12. A method according to claim 2, wherein the services menu received by the pervasive computing device comprises credentials for presentation by the pervasive computing device to access services identified in the services menu.

13. A method according to claim 2, wherein the received services menu is encrypted.

14. A method according to claim 12 further comprising the step of decrypting the received services menu.

15. A method for discovering the service directory of a data processing system connected to a network, the method comprising the steps of:
   broadcasting to a plurality of devices connected to the network, a Request Services Menu message;
   receiving, in response to the broadcast Request Services Menu message, a services menu associated with the data processing system;
   providing the received services menu to a user of the data processing system, wherein the data processing system is a pervasive computing device;
   receiving a Services Menu Update message containing information associated with a modification to the services menu of the pervasive computing device; and
   revising the services menu displayed to the user to incorporate the modifications to the services menu contained in the Services Menu Update message.

16. A method according to claim 15, wherein the Services Menu Update message contains at least one of information regarding a delete operation, information regarding an add operation and information regarding a replace operation.

17. A method according to claim 15, further comprising the steps of:

determining if a change to the services menu of the pervasive computing device has occurred; and transmitting a Services Menu Update message to the pervasive computing device if a change to the services menu of the pervasive computing device has occurred.

18. A system for discovering the service directory of a data processing system connected to a network, comprising:

means for broadcasting to a plurality of devices connected to the network, a Request Services Menu message;

means for receiving, in response to the broadcast Request Services Menu message, a services menu associated with the data processing system; and means for providing the received services menu to a user of the data processing system.

19. A system according to claim 18, wherein the data processing system is a pervasive computing device.

20. A system according to claim 18, wherein the Request Services Menu message provides information about the data processing system broadcasting the message.

21. A system according to claim 19, wherein the services menu received in response to the broadcast Request Services Menu message is a pointer to a services menu file, further comprising means for requesting the services menu file utilizing the pointer received in response to the broadcast Request Services Menu message.

22. A system according to claim 20, wherein the Request Services Menu message includes at least one of, information regarding a user of the pervasive computing device, information regarding the type of pervasive computing device and information regarding the connection between the pervasive computing device and the network, further comprising:

means for selecting a pointer to a services menu file based on the at least one of information regarding a user of the pervasive computing device, information regarding the type of pervasive computing device and information regarding the connection between the pervasive computing device and the network included in the Request Services Menu message; and means for transmitting, in response to the broadcast Request Services Menu message, the selected pointer to a services menu to the pervasive computing device.

23. A system according to claim 21, wherein the pointer is a Universal Resource Locator (URL).

24. A system according to claim 19, further comprising:

means for generating a services menu for transmission to the pervasive computing device in response to receiving a broadcast Request Services Menu message from the pervasive computing device; and means for transmitting the services menu to the pervasive computing device.

25. A system according to claim 24, wherein the means for generating a services menu comprises the means for accessing a services menu database.

26. A system according to claim 25, wherein the Request Services Menu message includes at least one of, information regarding a user of the pervasive computing device, information regarding the type of pervasive computing device and information regarding the connection between the pervasive computing device and the network, and wherein the services menu database is accessed based on the at least one of information regarding a user of the pervasive computing device, information regarding the type of pervasive computing device and information regarding the connection between the pervasive computing device and the network included in the Request Services Menu message.

27. A system according to claim 19, wherein the services menu received by the pervasive computing device comprises pointers to additional services menus accessible to the pervasive computing device.

28. A system according to claim 19, wherein at least one of the services associated with the services menu received by the pervasive computing device is a telephony service.

29. A system according to claim 19, wherein the services menu received by the pervasive computing device comprises credentials for presentation by the pervasive computing device to access services identified in the services menu.

30. A system according to claim 19, wherein the received services menu is encrypted.

31. A system according to claim 30 further comprising means for decrypting the received services menu.

32. A system for discovering the service directory of a data processing system connected to a network, comprising:

means for broadcasting to a plurality of devices connected to the network, a Request Services Menu message;

means for receiving, in response to the broadcast Request Services Menu message, a services menu associated with the data processing system;

means for providing the received services menu to a user of the data processing system, wherein the data processing system is a pervasive computing device;

means for receiving a Services Menu Update message containing information associated with a modification to the services menu of the pervasive computing device; and means for revising the services menu displayed to the user to incorporate the modifications to the services menu contained in the Services Menu Update message.

33. A system according to claim 32, wherein the Services Menu Update message contains at least one of information regarding a delete operation, information regarding an add operation and information regarding a replace operation.

34. A system according to claim 32, further comprising:

means for determining if a change to the services menu of the pervasive computing device has occurred; and means for transmitting a Services Menu Update message to the pervasive computing device if a change to the services menu of the pervasive computing device has occurred.

35. A computer program product for discovering the service directory of a data processing system connected to a network, comprising:

a computer-readable storage medium having computer readable program code means embodied in said medium, said computer-readable program code means comprising:

computer-readable program code means for broadcasting to a plurality of devices connected to the network, a Request Services Menu message;

computer-readable program code means for receiving, in response to the broadcast Request Services Menu message, a services menu associated with the data processing system; and computer-readable program code means for providing the received services menu to a user of the data processing system.

36. A computer program product according to claim 35, wherein the data processing system is a pervasive computing device.

37. A computer program product according to claim 35, wherein the Request Services Menu message provides information about the data processing system broadcasting the message.

38. A computer program product according to claim 36, wherein the services menu received in response to the broadcast Request Services Menu message is a pointer to a services menu file, further comprising computer-readable program code means for requesting the services menu file utilizing the pointer received in response to the broadcast Request Services Menu message.

39. A computer program product according to claim 38, wherein the Request Services Menu message includes at least one of, information regarding a user of the pervasive computing device, information regarding the type of pervasive computing device and information regarding the connection between the pervasive computing device and the network, further comprising:

computer-readable program code means for selecting a pointer to a services menu file based on the at least one of information regarding a user of the pervasive computing device, information regarding the type of pervasive computing device and information regarding the connection between the pervasive computing device and the network included in the Request Services Menu message; and computer-readable program code means for transmitting, in response to the broadcast Request Services Menu message, the selected pointer to a services menu to the pervasive computing device.

40. A computer program product according to claim 38, wherein the pointer is a Universal Resource Locator (URL).

41. A computer program product according to claim 36, further comprising:

computer-readable program code means for generating a services menu for transmission to the pervasive computing device in response to receiving a broadcast Request Services Menu message from the pervasive computing device; and computer-readable program code means for transmitting the services menu to the pervasive computing device.

42. A computer program product according to claim 41, wherein the computer-readable program code means for generating a services menu comprises the computer-readable program code means for accessing a services menu database.

43. A computer program product according to claim 42, wherein the Request Services Menu message includes at least one of, information regarding a user of the pervasive computing device, information regarding the type of pervasive computing device and information regarding the connection between the pervasive computing device and the network, and wherein the services menu database is accessed based on the at least one of information regarding a user of the pervasive computing device, information regarding the type of pervasive computing device and information regarding the connection between the pervasive computing device and the network included in the Request Services Menu message.

44. A computer program product according to claim 36, wherein the services menu received by the pervasive computing device comprises pointers to additional services menus accessible to the pervasive computing device.

45. A computer program product according to claim 36, wherein at least one of the services associated with the services menu received by the pervasive computing device is a telephony service.

46. A computer program product according to claim 36, wherein the services menu received by the pervasive computing device comprises credentials for presentation by the pervasive computing device to access services identified in the services menu.

47. A computer program product according to claim 36, wherein the received services menu is encrypted.

48. A computer program product according to claim 47 further comprising computer-readable program code means for decrypting the received services menu.

49. A computer program product for discovering the service directory of a data processing system connected to a network, comprising:

a computer-readable storage medium having computer readable program code means embodied in said medium, said computer-readable program code means comprising:

computer-readable program code means for broadcasting to a plurality of devices connected to the network, a Request Services Menu message;

computer-readable program code means for receiving, in response to the broadcast Request Services Menu message, a services menu associated with the data processing system;

computer-readable program code means for providing the received services menu to a user of the data processing system, wherein the data processing system is a pervasive computing device;

computer-readable program code means for receiving a Services Menu Update message containing information associated with a modification to the services menu of the pervasive computing device; and computer-readable program code means for revising the services menu displayed to the user to incorporate the modifications to the services menu contained in the Services Menu Update message.

50. A computer program product according to claim 49, wherein the Services Menu Update message contains at least one of information regarding a delete operation, information regarding an add operation and information regarding a replace operation.

51. A computer program product according to claim 49, further comprising:

computer-readable program code means for determining if a change to the services menu of the pervasive computing device has occurred; and computer-readable program code means for transmitting a Services Menu Update message to the pervasive computing device if a change to the services menu of the pervasive computing device has occurred.

* * * * *

UNITED STATES PATENT AND TRADEMARK OFFICE
CERTIFICATE OF CORRECTION

PATENT NO. : 6,477,576 B2
DATED : November 5, 2002
INVENTOR(S) : Angwin et al.

It is certified that error appears in the above-identified patent and that said Letters Patent is hereby corrected as shown below:

Title page,
Item [56], References Cited, FOREIGN PATENT DOCUMENTS, the following foreign patent document should be added:

-- 10-116237    5/1998    Japan --

Column 2,
Line 1, should read as follows: -- (SpeechML) or Voice Markup Language (VoXML) menu --

Column 4,
Line 43, should read as follows: -- DETAILED DESCRIPTION OF PREFERRED --

Column 12,
Line 36, should read as follows: -- by the pervasive computing device is a telephone service. --

Column 14,
Line 7, should read as follows: -- by the pervasive computing device is a telephone service. --

Column 16,
Line 6, should read as follows: -- is a telephone service. --

Signed and Sealed this

First Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,477,576 B2                                            Page 2 of 2
DATED         : November 5, 2002
INVENTOR(S)   : Angwin et al.

It is certified that error appears in the above-identified patent and that said Letters Patent is hereby corrected as shown below:

Drawings,
Figure 5 should appear as follows:

UNITED STATES PATENT AND TRADEMARK OFFICE
CERTIFICATE OF CORRECTION

PATENT NO. : 6,477,576 B2
DATED : November 5, 2002
INVENTOR(S) : Angwin et al.

It is certified that error appears in the above-identified patent and that said Letters Patent is hereby corrected as shown below:

<u>Title page</u>,
Item [74], *Attorney, Agent, or Firm* should be listed as follows: Myers Bigel Sajovec --.
Related Applications should read -- The present application is a Continuing Prosecution Application of, and claims priority from, United States Patent Application Serial No. 09/335,375 filed June 17, 1999. --

Signed and Sealed this

Ninth Day of September, 2003

JAMES E. ROGAN
*Director of the United States Patent and Trademark Office*